United States Patent
Kashiwazaki et al.

(10) Patent No.: US 6,399,674 B1
(45) Date of Patent: *Jun. 4, 2002

(54) INK SET AND INK-JET COLOR RECORDING METHOD USING THE SAME

(75) Inventors: Akio Kashiwazaki, Yokohama; Yuko Suga; Hiroyuki Ishinaga, both of Tokyo; Hiromichi Noguchi, Hachioji; Yutaka Kurabayashi, Tokorozawa; Aya Takaide; Kiyomitsu Kudo, both of Yokohama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/501,564

(22) Filed: Jul. 12, 1995

(30) Foreign Application Priority Data

Jul. 13, 1994 (JP) .............................................. 6-183049
Jul. 3, 1995 (JP) .............................................. 7-187660

(51) Int. Cl.$^7$ .......................... C09D 11/10; C09D 11/02
(52) U.S. Cl. ....................... 523/161; 524/236; 524/495; 524/538; 106/31.13; 106/31.9; 106/472; 106/478; 347/100; 260/DIG. 38
(58) Field of Search .................. 523/161; 260/DIG. 38; 524/538, 236, 495; 106/20 D, 20 R, 31.13, 472, 478, 31.9; 347/100

(56) References Cited

U.S. PATENT DOCUMENTS

| | | | | |
|---|---|---|---|---|
| 2,676,873 A | * | 4/1954 | Clines et al. | 106/478 |
| 5,338,597 A | | 8/1994 | Kurabayashi et al. | 428/195 |
| 5,555,008 A | * | 9/1996 | Stoffel et al. | 347/100 |

FOREIGN PATENT DOCUMENTS

| | | |
|---|---|---|
| EP | 0588241 | 3/1994 |
| EP | 0588316 | 3/1994 |
| EP | 0633142 | 1/1995 |
| JP | 2-255875 | 10/1990 |
| JP | 4-57859 | 2/1992 |
| JP | 4-57860 | 2/1992 |
| JP | 4-334870 | 11/1992 |
| JP | 588316 | * 3/1994 |

* cited by examiner

Primary Examiner—Blaine Copenheaver
Assistant Examiner—John J. Guarriello
(74) Attorney, Agent, or Firm—Fitzpatrick, Cella, Harper & Scinto

(57) ABSTRACT

Disclosed herein is a set of water-based pigment inks for ink-jet, comprising a black pigment ink and other pigment inks different in hue from the black pigment ink, which the pigment inks each comprise water, a water-soluble organic solvent and an aqueous pigment dispersion, wherein respective polymeric dispersants used in the black pigment ink and the other pigment inks different in hue from the black pigment ink are different in polarity from each other.

30 Claims, 3 Drawing Sheets

INK SET AND INK-JET COLOR RECORDING METHOD USING THE SAME

BACKGROUND OF THE INVENTION

1. Field of the Invention

The present invention relates to a set of pigment inks for ink-jet color recording and an ink-jet color recording method using such an ink set, and more particularly to an ink set, which is composed of a black ink and other pigment inks (hereinafter referred to as color inks) different in hue from the black ink, said black and color inks each comprising an aqueous pigment dispersion, and permits the provision of recorded images excellent in quality and in particular, free of interdiffusion or color bleeding (hereinafter referred to as "bleeding" simply) between the black ink and the color inks on so-called plain paper such as woodfree paper, paper for copying, letter paper, thermal transfer paper and business forms for wire-dot printers, and transparent recording media such as transparent films for overhead projectors, and an ink-jet color recording method using such an ink set.

2. Related Background Art

In recent years, it has been attempted to use water-based pigment inks in On-Demand ink-jet recording because the water-based pigment inks are the best materials for imparting fastness properties such as water fastness and light fastness to the resulting recorded images even in ink-jet systems. Inks for printers of ink-jet systems are required to have the following performance characteristics:

(1) providing images sufficient in optical density;
(2) being good in drying ability on recording media;
(3) providing recorded images on which neither feathering nor bleeding occurs;
(4) providing recorded images which do not run out even when brought into contact with water, alcohol and the like;
(5) providing recorded images excellent in light fastness;
(6) causing no clogging at an orifice;
(7) causing no defects such as blurring on recorded images when continuously printing or resuming recording after long-term suspension of the recording;
(8) being stably storable;
(9) being safe for users; and
(10) causing no problem when coming into contact with members making up recording means.

Inks used in an ink-jet system making good use of thermal energy are also required in addition to the above requirements to have the following performance characteristic:

(11) being excellent in heat resistance and exerting no adverse influence on a thermal energy generating element.

Inks described in Japanese Patent Application Laid-Open Nos. 2-255875, 4-334870, 4-57859 and 4-57860 are disclosed as water-based pigment inks for ink-jet, which can settle the basic problems of print quality, ejection property, storage stability, resistance to clogging, fixing ability and the like.

With the advent of color printers and the development of software for personal computers, which is capable of processing color images, desktop presentation has begun to spread. Therefore, inks used in ink-jet color recording are required in addition to the above requirements (1) to (11) to have the following performance characteristic:

(12) providing color images in which character images are bright and both halftone images and line drawings are clear.

SUMMARY OF THE INVENTION

It is therefore an object of the present invention to provide a set of water-based pigment inks for ink-jet, which satisfies the above-mentioned general performance requirements and in particular, can provide color images in which character images are bright and both halftone images and line drawings are clear, and an ink-jet color recording method using such an ink set.

The above object can be achieved by the present invention described below.

According to the present invention, there is thus provided a set of water-based pigment inks for ink-jet, comprising a black pigment ink and other pigment inks different in hue from the black pigment ink, which the pigment inks each comprise water, a water-soluble organic solvent and an aqueous pigment dispersion, wherein respective polymeric dispersants used in the black pigment ink and the other pigment inks different in hue from the black pigment ink are different in polarity from each other.

According to the present invention, there is also provided an ink-jet color recording method comprising using a black pigment ink and other pigment inks different in hue from the black pigment ink, which the pigment inks each comprise water, a water-soluble organic solvent and an aqueous pigment dispersion, wherein respective polymeric dispersants used in the black pigment ink and the other pigment inks different in hue from the black pigment ink are different in polarity from each other.

DESCRIPTION OF THE PREFERRED EMBODIMENTS

Figure 1:
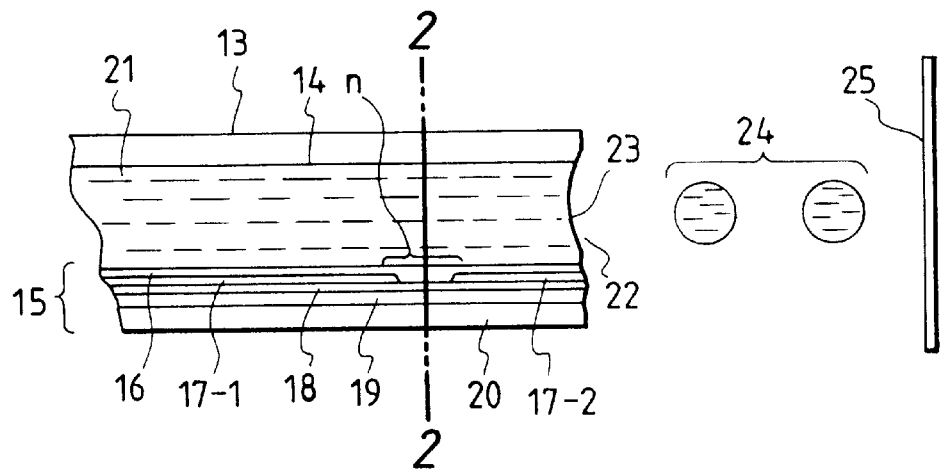
FIG. 1 is a typical cross-sectional view of a recording head according to an ink-jet recording system of the present invention.

According to the present invention, interdiffusion (bleeding at a boundary portion) between a black ink and a color ink on a recording medium can be prevented by varying the polarities of the dispersants used in the black ink and the color ink from each other. In order to vary the polarities of the dispersants in the respective inks from each other, for example, it is proposed to use a cationic dispersant in the black ink and an anionic dispersant in the color ink. To the contrary, it is also permissible to use an anionic dispersant in the black ink and a cationic dispersant in the color ink. The present invention will hereinafter be described in detail on the basis of only the former method. However, the latter method may also be practically feasible and effective.

The preferred embodiments of the present invention will hereinafter be described to explain the-present invention in more detail.

In the set of the water-based pigment inks for ink-jet and the ink-jet color recording method using such an ink set according to the present invention, a part of colorants contained in color inks other than a black ink may be water-soluble dyes such as acid dyes, direct dyes or basic dyes. However, It is preferable that all the inks be pigment inks.

The black pigment ink is preferably a black pigment ink obtained by subjecting a black pigment having a neutral or alkaline pH to a dispersion treatment using a water-soluble polymer made of at least a (meth)acrylic ester or (meth) acrylamide monomer having a tertiary amine salt or quaternary ammonium group, while the color inks each having a hue other than black, for example, yellow, magenta and cyan inks, are preferably pigment inks obtained by separately subjecting pigments having their corresponding hues to a dispersion treatment using an anionic polymeric dispersant having a carboxylic or sulfonic group as a hydrophilic group. Incidentally, the term "pH" of a black pigment means generally a pH value of an aqueous solution, in which a pigment is dispersed in pure water, obtained by a method similar to that for measurement of a pH value of carbon black.

In the case where a recording medium used in recording is plain paper, it is preferable that the interfacial tension of the black ink against the plain paper be higher than those of the color inks, and moreover that the penetration rate of the black ink into the plain paper be lower than those of the color inks.

When color recording is conducted on plain paper with the ink set as described above in accordance with an ink-jet system, an image good in fixing ability, high in optical density and scarce in bleeding can be provided. Even when recording is conducted on a transparent recording medium, a bright projected image may be provided. It goes without saying that if all inks used are pigment inks, the fastness to light and water of the resulting recorded image becomes far excellent.

The cationic polymeric dispersants used in the present invention are principally those obtained by polymerization of vinyl monomers. As examples of a cationic monomer constituting at least a part of the resulting polymer, may be mentioned salts of tertiary amine monomers as described below, and quaternized compounds thereof.

N,N-Dimethylaminoethyl methacrylate [$CH_2=C(CH_3)—COO—C_2H_4N(CH_3)_2$];

N,N-Dimethylaminoethyl acrylate [$CH_2=CH—COO—C_2H_4N(CH_3)_2$],

N,N-Dimethylaminopropyl methacrylate [$CH_2=C(CH_3)—COO—C_3H_6N(CH_3)_2$];

N,N-Dimethylaminopropyl acrylate [$CH_2=CH—COO—C_3H_6N(CH_3)_2$],

N,N-Dimethylacrylamide [$CH_2=CH—CON(CH_3)_2$];

N,N-Dimethylmethacrylamide [$CH_2=C(CH_3)—CON(CH_3)_2$];

N,N-Dimethylaminoethylacrylamide [$CH_2=CH—CONHC_2H_4N(CH_3)_2$];

N,N-Dimethylaminoethylmethacrylamide [$CH_2=C(CH_3)—CONHC_2H_4N(CH_3)_2$];

N,N-Dimethylaminopropylacrylamide [$CH_2=CH—CONHC_3H_6N(CH_3)_2$]; and

N,N-Dimethylaminopropylmethacrylamide [$CH_2=C(CH_3)—CONHC_3H_6N(CH_3)_2$].

In the case of the tertiary amines, examples of compounds used in forming their salts include hydrochloric acid, sulfuric acid and acetic acid. Examples of compounds used in quaternizing them include methyl chloride, dimethyl sulfate, benzyl chloride and epichlorohydrin. Of these, methyl chloride and dimethyl sulfate are preferred from the viewpoint of preparing the dispersants used in the present invention. The tertiary amine salts or the quaternary ammonium compounds as described above behave as cations in water, and stably dissolve in an acid region under neutralized conditions. These monomers are preferably contained in amounts ranging from 20 to 60% by weight in their corresponding copolymers.

Examples of other monomers used in forming the above-described polymeric dispersants include hydroxyl group-containing (meth)acrylic esters such as 2-hydroxyethyl methacrylate and acrylic esters having a long ethylene oxide chain as a side chain, and water-soluble monomers capable of dissolving in water of about pH 7, such as acrylamides, vinyl ethers, vinylpyrrolidones, vinylpyridines and vinyloxazolines. As the hydrophobic monomers, styrene, styrene derivatives, vinylnaphthalene, vinylnaphthalene derivatives, alkyl (meth)acrylates, acrylonitrile and the like are used. In a polymeric dispersant obtained by copolymerization, the water-soluble monomer(s) may preferably be used in a range of from 15 to 35% by weight with a view toward causing the copolymer to stably exist in an aqueous solution, while the hydrophobic monomer(s) may preferably be used in a range of 20 to 40% by weight with a view toward enhancing the dispersing effect of the copolymer on a pigment.

The amount of a pigment contained in each of the inks according to the present invention is within a range of from 1 to 20% by weight, preferably from 2 to 12% by weight based on the total weight of the ink. Carbon black used in a black ink may be that produced in accordance with the furnace process or channel process. Such carbon black preferably has properties that the primary particle diameter is 15 to 40 nm, the specific surface area is 50 to 300 $m^2/g$ as determined in accordance with the BET method, the oil absorption is 40 to 150 ml/100 g as determined by using DBP, the volatile matter is 0.5 to 3.0%, and the pH is from neutral to alkaline, for example, 7 to 10.

Examples of the carbon black pigment (C.I. Pigment Black 7) having such properties include #2600, #2300, #990, #980, #960, #950, #900, #850, #750, #650, MCF-88, MA-600, #95, #55, #52, #47, #45, #45L, #44, #40, #33, #32, #30, #25, #20, #10 and #5 (all, products of Mitsubishi Kagaku Co.); Printex 95, Printex 90, Printex 85, Printex 80, Printex 75, Printex 45, Printex 40, Printex P, Printex 60, Printex 300, Printex 30, Printex 35, Printex 25, Printex 200, Printex A, Printex G, Printex L6 and Printex L (all, products of Degussa); Raven 850, Raven 780 ULTRA, Raven 760 ULTRA, Raven 790 ULTRA, Raven 520, Raven 500, Raven 410, Raven 420, Raven 430, Raven 450, Raven 460, Raven 890 and Raven 1020 (all, products of Columbian Carbon Japan Limited); and Regal 415R, Regal 330R, Regal 250R, Regal 995R, Monarch 800, Monarch 880, Monarch 900, Monarch 460, Monarch 280 and Monarch 120 (all, products of Cabot Japan).

Examples of the pigment used in a yellow ink include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151 and C.I. Pigment Yellow 154.

Examples of the pigment used in a magenta ink include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184 and C.I. Pigment Red 202.

Examples of the pigment used in a cyan ink include C.I. Pigment Blue 1, C.I. Pigment Blue 2, C.I. Pigment Blue 3, C.I. Pigment Blue 15:3, C.I. Pigment Blue 15:6, C.I. Pigment Blue 15:34, C.I. Pigment Blue 16, C.I. Pigment Blue 22, C.I. Pigment Blue 60, C.I. Vat Blue 4 and C.I. Vat Blue 60.

Besides the above, the following pigments may preferably be used either singly or in combination when colors other than the three primary colors, such as red, green, blue and others, are required.

C.I. Pigment Red 209, C.I. Pigment Red 122, C.I. Pigment Red 224, C.I. Pigment Red 177, C.I. Pigment Red 194, C.I. Pigment Orange 43, C.I. Vat Violet 3, C.I. Pigment Violet 19, C.I. Pigment Green 36, C.I. Pigment Green 7, C.I. Pigment Violet 23, C.I. Pigment Violet 37, C.I. Pigment Blue 15:6, C.I. Pigment Blue 209 and the like.

Also, color inks may contain concurrently dyes mentioned below.

Examples of the dye used in an yellow ink include C.I. Acid Yellow 11, C.I. Acid Yellow 17, C.I. Acid Yellow 23, C.I. Acid Yellow 25, C.I. Acid Yellow 29, C.I. Acid Yellow 42, C.I. Acid Yellow 49, C.I. Acid Yellow 61, C.I. Acid Yellow 71, C.I. Direct Yellow 12, C.I. Direct Yellow 24, C.I. Direct Yellow 26, C.I. Direct Yellow 44, C.I. Direct Yellow 86, C.I. Direct Yellow 87, C.I. Direct Yellow 98, C.I. Direct Yellow 100, C.I. Direct Yellow 130 and C.I. Direct Yellow 142.

Examples of the dye used in a red ink include C.I. Acid Red 1, C.I. Acid Red 6, C.I. Acid Red 8, C.I. Acid Red 32, C.I. Acid Red 35, C.I. Acid Red 37, C.I. Acid Red 51, C.I. Acid Red 52, C.I. Acid Red 80, C.I. Acid Red 85, C.I. Acid Red 87, C.I. Acid Red 92, C.I. Acid Red 94, C.I. Acid Red 115, C.I. Acid Red 180, C.I. Acid Red 254, C.I. Acid Red 256, C.I. Acid Red 289, C.I. Acid Red 315, C.I. Acid Red 317, C.I. Direct Red 1, C.I. Direct Red 4, C.I. Direct Red 13, C.I. Direct Red 17, C.I. Direct Red 23, C.I. Direct Red 28, C.I. Direct Red 31, C.I. Direct Red 62, C.I. Direct Red 79, C.I. Direct Red 81, C.I. Direct Red 83, C.I. Direct Red 89, C.I. Direct Red 227, C.I. Direct Red 240, C.I. Direct Red 242 and C.I. Direct Red 243.

Examples of the dye used in a blue ink include C.I. Acid Blue 9, C.I. Acid Blue 22, C.I. Acid Blue 40, C.I. Acid Blue 59, C.I. Acid Blue 93, C.I. Acid Blue 102, C.I. Acid Blue 104, C.I. Acid Blue 113, C.I. Acid Blue 117, C.I. Acid Blue 120, C.I. Acid Blue 167, C.I. Acid Blue 229, C.I. Acid Blue 234, C.I. Acid Blue 254, C.I. Direct Blue 6, C.I. Direct Blue 22, C.I. Direct Blue 25, C.I. Direct Blue 71, C.I. Direct Blue 78, C.I. Direct Blue 86, C.I. Direct Blue 90, C.I. Direct Blue 106 and C.I. Direct Blue 199.

In the present invention, upon use of the cationic water-soluble polymer described above as dispersant to disperse a pigment, it is preferable from the viewpoint of physical properties that the pigment be adjusted so as to have an isoelectric point of at least 6 or to have a neutral or alkaline pH value of a simple aqueous dispersion which characterizes a pigment, for example, from 7 to 10. It is understood that such a pigment is preferred from the viewpoint of dispersibility owing to the fact that the ionic interaction between the pigment and the cationic water-soluble polymer becomes strong.

In order to obtain an aqueous dispersion of a finely particulate pigment using such materials as described above, it is preferable to use the following processes:

1) Case of Carbon Black:

Carbon black is premixed in a solution of a cationic dispersant and subsequently milled in a dispersing machine at a high shear rate. After diluted, the mixture is centrifuged to remove coarse particles from the dilute mixture. Thereafter, materials necessary for achieving the desired ink formulation are added, and the resulting mixture is aged if circumstances require. Thereafter, the thus-treated mixture is centrifuged to obtain a pigment dispersion having the desired average particle diameter. The pH of the ink thus prepared is adjusted to a range of from 3 to 7.

2) Case of Pigments Different in Hue from Carbon Black:

A treatment is conducted in basically the same manner as in carbon black except that an anionic dispersant is used. However, when an organic pigment difficult to make its particle diameter fine is used, it is desirable to use a processed pigment improved in wettability in the following manner. Namely, a treatment with a surfactant is performed at the same time as the synthesis of the pigment or in the course of the synthesis to inhibit the crystal growth of pigment particles.

In each case of the carbon black ink and color inks, it is essential from the viewpoint of stability of the resulting dispersion that the average particle diameter of the pigment be within a range of from 80 to 200 nm, preferably from 80 to 150 nm. The surface tension of the ink be within a range of from 30 to 60 dyn/cm.

In the case where recording is conducted on plain paper with these inks, the black ink may preferably be high in interfacial tension against the paper from the viewpoint of providing bright recorded characters. On the other hand, color inks may preferably be low in interfacial tension against the paper because high penetration rate gives better results from the viewpoint of lessening bleeding due to the mutual diffusion between the color inks. When the black ink is acidic and has a high interfacial tension, and each of the color inks is basic and has a low interfacial tension as described above, the black ink scarcely shows a tendency to run into the color ink, so that occurrence of bleeding between the black ink and the color ink is substantially completely prevented. The interfacial tension between the ink and the paper is a value measured by means of, for example, a device (WET-3000, trade name, manufactured by Resca K.K., a device using the Wilhelmy method) commercially sold as a dynamic wettability tester. The term "high in interfacial tension" means that the contact angle of the ink with the plain paper is wider than 90° even in a short period of 1 to several seconds, while the term "low in interfacial tension" denotes that the contact angle of the ink with the plain paper is not wider than 90°.

The dispersant used in the color inks to be used in the present invention is a water-soluble resin of the alkali-soluble type, which has a weight average molecular weight ranging from 1,000 to 30,000, preferably from 3,000 to 15,000. Specific examples of such a dispersant include copolymers composed of at least one of hydrophobic monomers such as styrene, styrene derivatives, vinylnaphthalenes, vinylnaphthalene derivatives, alkyl acrylates and alkyl methacrylates, and at least one of hydrophilic monomers such as α,β-ethylenically unsaturated carboxylic acids and aliphatic alcohol esters thereof, acrylic acid, methacrylic acid, maleic acid, itaconic acid, fumaric acid, and derivatives thereof, and salts of these copolymers. The copolymers may have any structure of random, block and graft copolymers, and their acid values range from 100 to 430, preferably from 130 to 360.

As dispersants used in the present invention, there may also be used water-soluble polymers such as polyvinyl alcohol and carboxymethylcellulose, and water-soluble resins such as condensates of naphthalenesulfonic acid and formaldehyde, and polystyrene sulfonic acid. However, the water-soluble resins of the alkali-soluble type are more favorable in that the viscosity of the resulting dispersion can be made lower, and dispersing operation is also easier. The amount of these dispersants to be used is such that the weight ratio of the pigment to the dispersant falls within a range of from 10:3 to 10:0.5. A proper ratio is experimentally determined by using select pigment and dispersant. It is however desirable that the amount of the resin dissolved in the ink and not adsorbed on the pigment be not more than 2% by weight based on the total weight of the ink.

The use of the above-described dispersants requires a base. Examples of preferable bases used in this case include organic bases such as ethanolamine, diethanolamine, triethanolamine, N-methylethanolamine, N-ethyldiethanolamine, 2-amino-2-methylpropanol, 2-ethyl-2-amino-1,3-propanediol, 2-(2-aminoethyl) ethanolamine, tris(hydroxymethyl)aminomethane, ammonia, piperidine, morpholine and β-dihydroxyethylurea, and inorganic bases such as sodium hydroxide, potassium hydroxide and lithium hydroxide. The most suitable base varies according to the kinds of the select pigment and dispersant. However, a base which is nonvolatile, stable and high in water retention is preferred. The amount of the base can be calculated basically from amounts calculated from the acid value of the dispersant as an amount of the base required to neutralize the dispersant. The base may be used in an amount more than the equivalent amount of the acid in some cases. This is made for the purpose of improving dispersibility of the pigment, adjusting the pH and recording performance of the resulting ink or enhancing the moisture retention of the ink.

Solvents used in the inks according to the present invention are organic solvents miscible with water. Such organic solvents may be divided into the following three groups:

the first group of solvents which are high in moisture retention, difficult to evaporate and excellent in hydrophilicity;

the second group of solvents which have organicity and are good in wettability to a hydrophobic surface having organicity and also have high evaporating and drying ability; and the third group of solvents (monohydric alcohols) which have moderate wettability and a low viscosity.

As solvents belonging to the first group, may be mentioned ethylene glycol, diethylene glycol, triethylene glycol, tripropylene glycol, glycerol, 1,2,4-butanetriol, 1,2,6-hexanetriol, 1,2,5-pentanetriol, 1,2-butanediol, 1,3-butanediol, 1,4-butanediol, dimethylsulfoxide, diacetone alcohol, glycerol monoallyl ether, -propylene glycol, butylene glycol, polyethylene glycol 300, thiodiglycol, N-methyl-2-pyrrolidone, 2-pyrrolidone, γ-butyrolactone, 1,3-dimethyl-2-imidazolidinone, sulfolane, trimethylolpropane, trimethylolethane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxyethylurea, urea, acetonylacetone, pentaerythritol, 1,4-cyclohexanediol and the like.

As solvents belonging to the second group, may be mentioned hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, glycerol monoacetate, glycerol diacetate, glycerol triacetate, ethylene glycol monomethyl ether acetate, diethylene glycol monomethyl ether acetate, cyclohexanol, 1,2-cyclohexanediol, 1-butanol, 3-methyl-1,5-pentanediol, 3-hexene-2,5-diol, 2,3-butanediol, 1,5-pentanediol, 2,4-pentanediol, 2,5-hexanediol and the like.

As solvent belonging to the third group, may be mentioned ethanol, n-propanol, 2-propanol, 1-methoxy-2-propanol, furfuryl alcohol, tetrahydrofurfuryl alcohol and the like.

The water-soluble solvents as described above may preferably be used in a range of generally from 5 to 40% by weight in total based on the total weight of the ink.

Surfactants, pH adjustors, antiseptics and the like may be added to the water-based pigment inks according to the present invention. The surfactants are useful for the preparation of color inks high in penetrability, adjustment of wettability to heaters and ejection nozzles in a bubble jet system, and the like. Such an ingredient may be suitably selected from existing products on the market.

The physical properties of the inks composed of the above-described ingredients are described collectively. The black ink is acidic and preferably has a high surface tension (about 40 to 65 dyn/cm), while the color inks are basic and preferably have a low surface tension (about 25 to 40 dyn/cm).

When only the water-based black pigment ink according to the present invention as described above is used to conduct recording on plain paper in accordance with an ink-jet system, excellent quality as to fixing ability and image density is exhibited on neutralized paper because the ink is acidic. When the plain paper is neutralized paper, impact ink droplets aggregate owing to the interaction with a basic substance in the paper before feathering occurs, and so sharp edges are formed. For the same reason, the density of the resulting image also becomes excellent.

When the water-based acid black pigment ink and basic color inks according to the present invention are used to conduct color recording on plain paper, black characters and the like are brightly printed, and no bleeding occur even if the black characters adjoin picture images or graphs. Therefore, both images are legible.

An ink-jet recording method is effective as a color recording method using the ink set according to the present invention. As a recording medium, there may be used any of general-purpose plain paper (for example, woodfree paper, medium-quality paper and bond paper), coated paper, plastic films for OHP, etc.

The inks according to the present invention are particularly suitable for use in an ink-jet recording system of the type that an ink is ejected by the bubbling phenomenon of the ink caused by thermal energy. This recording system has a feature that the ejection of the ink becomes extremely stable, and no satellite dots generate. In this case, the thermal properties, for example, specific heat, coefficient of thermal expansion and heat conductivity, of the ink must however be adjusted in some cases.

The inks according to the present invention may suitably be used, particularly, in an ink-jet recording system of the type that droplets of an ink are ejected by the action of thermal energy, thereby conducting recording. However, it goes without saying that the inks may also be used for general-purpose writing utensils.

As a preferred method and apparatus for conducting recording by using the inks according to the present invention, may be mentioned a method and apparatus in which thermal energy corresponding to recording signals is applied to an ink within a recording head, and ink droplets are generated in accordance with the thermal energy. Such an ink-jet recording apparatus will hereinafter be described.

Figure 2:
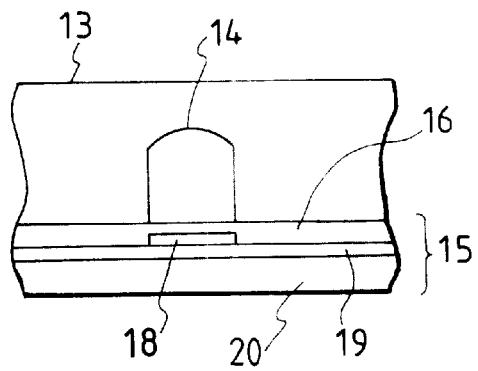
FIG. 2 is a typical cross-sectional view taken on line 2—2 in FIG. 1.

An example of the construction of a head, which is a main component of such an apparatus, is illustrated in FIGS. 1 and 2. FIG. 1 is a typical cross-sectional view of a head 13 taken along the flow path of ink, and FIG. 2 is a typical cross-sectional view taken along line 2—2 in FIG. 1. The head 13 is formed by bonding a glass, ceramic or plastic plate or the like having a groove 14 through which an ink is passed, to a heating head 15, which is used for thermal recording (the drawings show a thin-film head to which, however, is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 owing to a pressure not illustrated. Now, upon application of electric signals to the electrodes 17-1 and 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the ejection orifice 22 to a recording medium 25 in the form of ink droplets 24.

Figure 3:
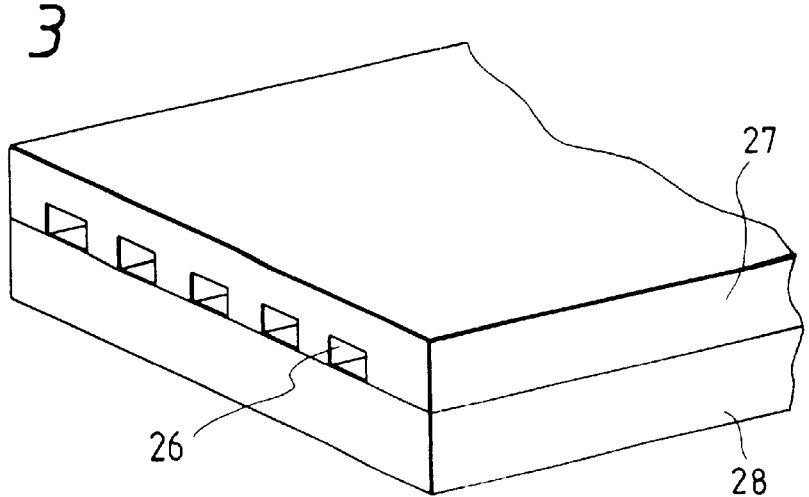
FIG. 3 is a typical perspective view illustrating an exemplary multi-head which is an array of such heads as shown in FIG. 1.

FIG. 3 illustrates an exemplary multi-head composed of an array of a number of heads as shown in FIG. 1. The multi-head is formed by bonding a glass plate 27 having a number of grooves 26 to a heating head 28 similar to the head as illustrated in FIG. 1.

Figure 4:
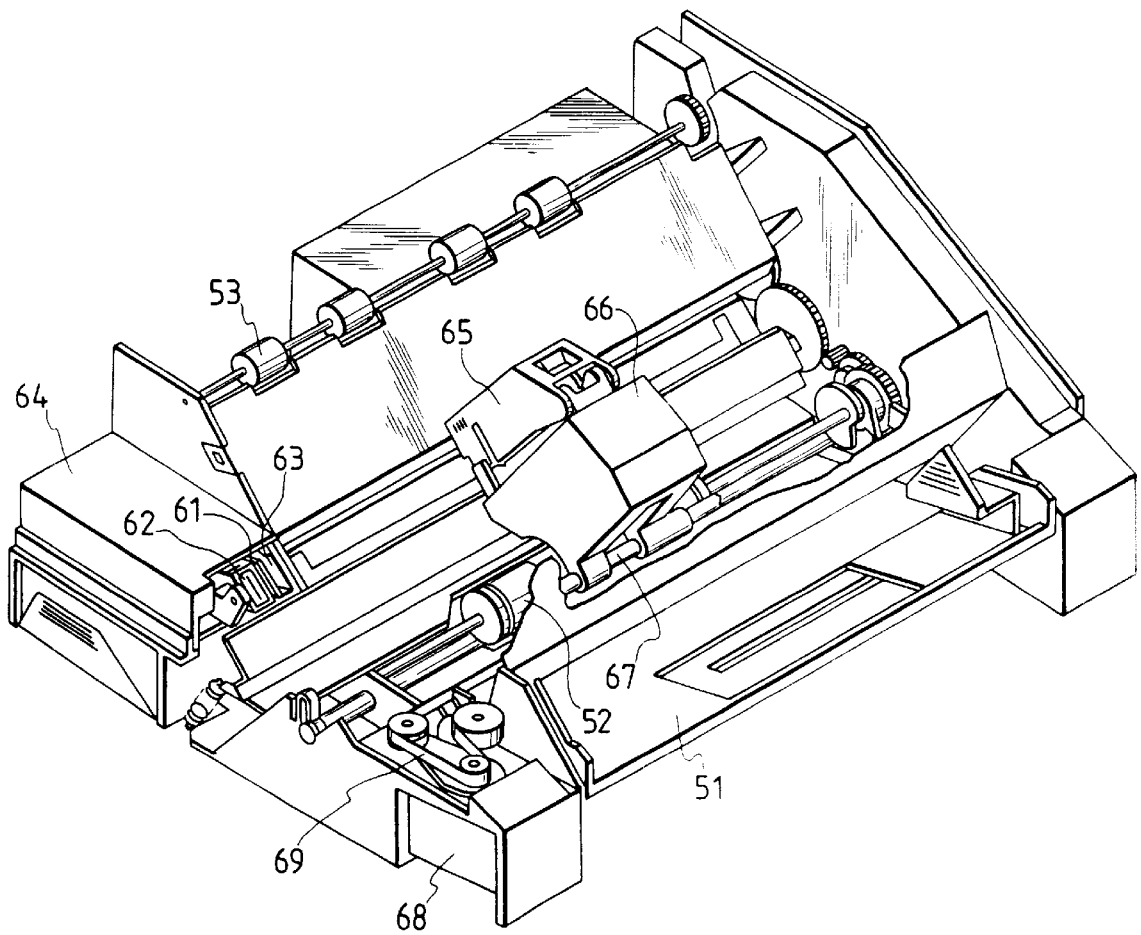
FIG. 4 is a typical perspective view illustrating an ink-jet recording apparatus in which the head illustrated in FIG. 1 has been incorporated.

FIG. 4 illustrates an exemplary ink-jet recording apparatus in which this head has been incorporated. In FIG. 4, reference numeral 65 designates the recording head having an ejection-energy-generating means and serving to eject the ink onto a recording medium set in an opposing relation with an ejection opening face provided with ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such construction, the recording medium is fed to the position opposite to the ejection opening face of the recording head 65, and discharged from a discharge section provided with discharge rollers 53 with the progress of recording.

Reference numeral 61 designates a blade serving as a wiping member, one end of which is a stationary end held by a blade-holding member to form a cantilever (not illustrated). The blade 61 is provided at a position adjacent to a region in which the recording head 65 operates, and in this embodiment, is held in such a form that it protrudes to the course through which the recording head 65 is moved. Reference numeral 62 indicates a cap for the ejection opening face of the recording head 65, which is provided at a home position adjacent to the blade 61, and is so constituted that it moves in a direction perpendicular to a direction in which the recording head 65 is moved and comes into contact with the face of the ink-ejecting openings to cap it. Reference numeral 63 denotes an ink-absorbing member provided adjoiningly to the blade 61 and, similar to the blade 61, held in such a form that it protrudes to the course through which the recording head 65 is moved. The above-described blade 61, cap 62 and ink-absorbing member 63 constitute an ejection-recovery portion 64, where the blade 61 and ink-absorbing member 63 remove water, dust and/or the like from the face of the ink-ejecting openings.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head 65.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement. The above movement of the recording head 65 to its home position is made not only when the recording is completed or the recording head is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
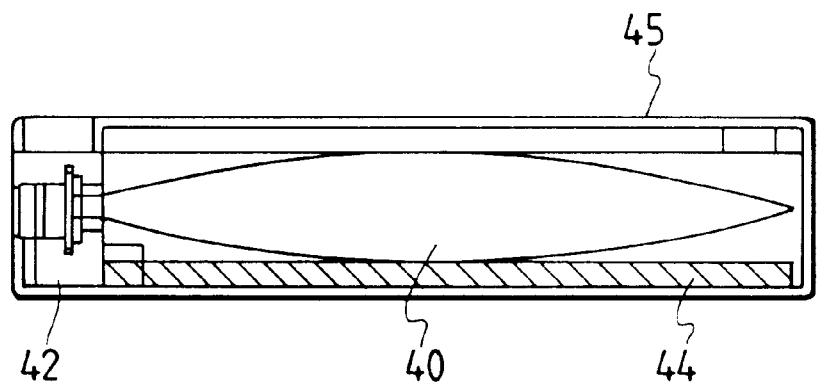
FIG. 5 is a typical cross-sectional view illustrating an ink cartridge from which a recording liquid is fed to the head illustrated in FIG. 1.

FIG. 5 illustrates an exemplary ink cartridge 45 in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred in the present invention that the ink container portion is formed of a polyolefin, in particular, polyethylene, at its surface with which the ink comes into contact.

The ink-jet recording apparatus in which the inks according to the present invention are used is not limited to the apparatus as described above in which the head and the ink cartridge are separately provided. Therefore, a device in which these members are integrally formed as shown in FIG. 6 can also be preferably used.

Figure 6:
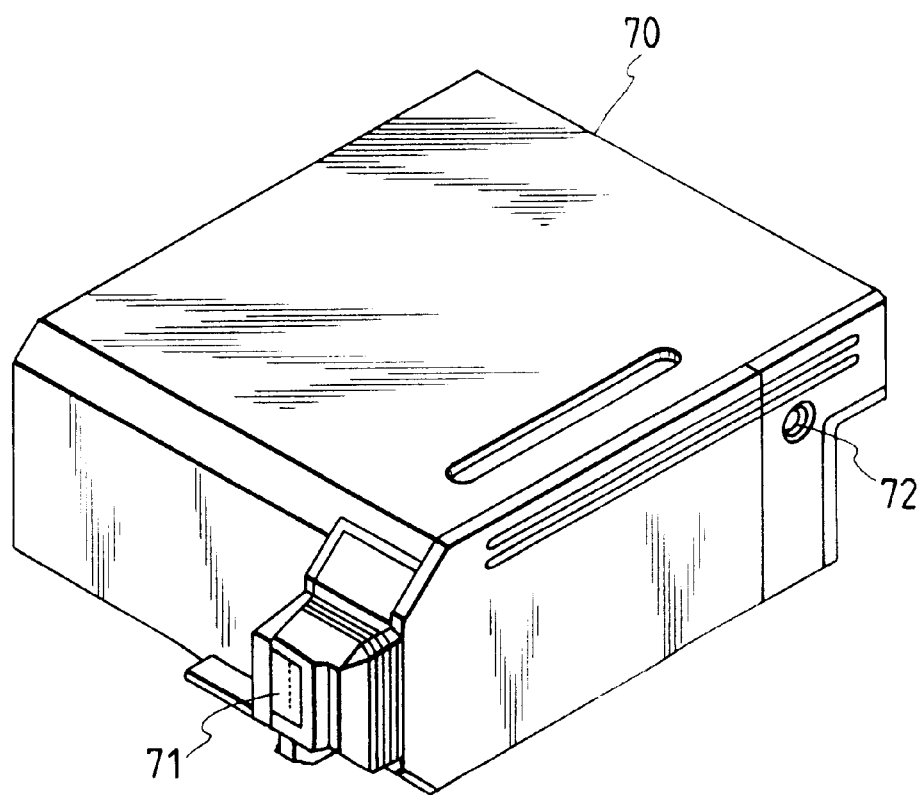
FIG. 6 is a typical perspective view illustrating principal parts of an ink-jet recording apparatus in which the head shown in FIG. 1 has been formed integrally with the ink cartridge shown in FIG. 5.

In FIG. 6, reference numeral 70 designates a recording unit (ink-jet cartridge), in the interior of which an ink-absorbing member impregnated with an ink is contained. The recording unit 70 is so constructed that the ink in such an ink-absorbing member is ejected in the form of ink droplets through a head 71 having a plurality of orifices. Polyurethane is preferred as a material for the ink-absorbing member.

Reference numeral 72 indicates an air passage for communicating the interior of the ink-jet cartridge 70 with the atmosphere. This ink-jet cartridge 70 can be used in place of the recording head 65 shown in FIG. 4, and is detachably installed on the carriage 66.

The present invention will hereinafter be described more specifically by the following examples and comparative example. Incidentally, all designations of "part" or "parts" as will be used in the following examples mean part or parts by weight unless expressly noted.

Example 1

(Preparation of Inks):

[Black Ink B-1]

Cationic Polymer P-1 (weight average molecular weight: 10,000, pH of aqueous solution: 3.26) containing acrylamide and trimethylaminopropylacrylamide sulfate as monomers in a weight ratio of 70:30 was used as a dispersant to prepare the following Carbon Black Dispersion D-1.

| | |
|---|---|
| Aqueous solution of Cationic Polymer P-1 (solid content: 20% by weight) | 40 parts |
| Carbon black (MCF-88, product of Mitsubishi Chemical Industries Limited) | 24 parts |
| Diethylene glycol | 20 parts |
| Isopropyl alcohol | 10 parts |
| Water | 130 parts. |

The above materials were charged in a batch-wise vertical sand mill (manufactured by Aimex Company), and glass beads having a diameter of 1 mm were charged as a grinding medium to conduct a dispersion treatment for 3 hours while cooling with water. After the dispersion treatment, the dispersion had a viscosity of 28 cP and a pH of 4.05. This dispersion was centrifuged to remove coarse particles, thereby obtaining Dispersion D-1 having an average particle diameter of 120 nm. This fine dispersion was diluted with water to obtain acid ink-jet Black Ink B-1 having a viscosity of 5 cP, a surface tension of 45 dyn/cm and a pH of 4.0. The final product had a solid content of about 10% by weight.

Average diameters were measured with the dynamic light scattering particle diamter measurement-equipment: ELS-800 (Ohtsuka Electric Co. Japan). Values measured were calculated from the initial slope of auto-correlation function.

[Black Ink B-2]

Carbon Black Dispersion D-2 having an average particle diameter of 130 nm was prepared in the same manner as in Carbon Black Dispersion D-1 except that Cationic Polymer P-2 (weight average molecular weight: 11,000, pH of aqueous solution: 2.84) containing acrylamide, acrylonitrile and dimethylaminoethyl methacrylate sulfate as monomers in a weight ratio of 40:10:50 was used as a dispersant. This fine dispersion was diluted with water to obtain acid ink-jet Black Ink B-2 having a viscosity of 4.5 cP, a surface tension of 50 dyn/cm and a pH of 4.2. The final product had a solid content of about 10% by weight.

[Black Ink B-3]

Cationic Polymer P-3 (weight average molecular weight: 5,000, pH of aqueous solution: 3.03) containing acrylamide, trimethylaminopropylacrylamide sulfate and methyl acrylate as monomers in a weight ratio of 40:30:30 was used as a dispersant to prepare the following Carbon Black Dispersion D-3.

| | |
|---|---|
| Aqueous solution of Cationic Polymer P-3 (solid content: 20% by weight) | 40 parts |
| Carbon black (#2600, product of Mitsubishi Chemical Industries Limited) | 24 parts |
| Water | 160 parts. |

The above materials were charged in a batch-wise vertical sand mill (manufactured by Aimex Company), and glass beads having a diameter of 1 mm were charged as a grinding medium to conduct a dispersion treatment for 3 hours while cooling with water. After the dispersion treatment, the dispersion had a viscosity of 25 cP and a pH of 3.56. This dispersion was centrifuged to remove coarse particles, thereby obtaining Dispersion D-3 having an average particle diameter of 135 nm. This fine dispersion was diluted with water, glycerol and isopropyl alcohol (weight ratio=75:20:5) to obtain acid ink-jet Black Ink B-3 having a viscosity of 3.5 cP, a surface tension of 53 dyn/cm and a pH of 3.75. The final product had a solid content of about 8% by weight.

[Black Ink B-4]

Cationic Polymer P-4 (weight average molecular weight: 8,000, pH of aqueous solution: 3.03) containing acrylamide, trimethylaminopropylacrylamide sulfate and styrene as monomers in a weight ratio of 25:50:25 was used as a dispersant to prepare the following Carbon Black Dispersion D-4.

| | |
|---|---|
| Aqueous solution of Cationic Polymer P-4 (solid content: 20% by weight) | 30 parts |
| Carbon black (MFC #850, product of Mitsubishi Chemical Industries Limited) | 24 parts |
| Water | 174 parts. |

The above materials were charged in a batch-wise vertical sand mill (manufactured by Aimex Company), and glass beads having a diameter of 1 mm were charged as a grinding medium to conduct a dispersion treatment for 3 hours while cooling with water. After the dispersion treatment, the dispersion had a viscosity of 30 cP and a pH of 3.30. This dispersion was centrifuged to remove coarse particles, thereby obtaining Dispersion D-4 having an average particle diameter of 150 nm. This fine dispersion was diluted with water, diethylene glycol and isopropyl alcohol (weight ratio=75:20:5) to obtain acid ink-jet Black Ink B-4 having a viscosity of 3.2 cP, a surface tension of 47 dyn/cm and a pH of 3.40. The final product had a solid content of about 7% by weight.

[Color Ink: Magenta Ink M-1]

A solution obtained by dissolving Copolymer P-5 (acid value: 265, weight average molecular weight: 8,000, glass transition temperature: 67° C.) composed of styrene, acrylic acid and butyl acrylate in water using ethanolamine was used to disperse Pigment Red 122 (Fastgen Super Magenta RT, product of Dainippon Ink & Chemicals, Incorporated) therein. The dispersing procedure was the same as in Dispersion D-1. However, a weight ratio of the dispersant to the pigment was 1:6, the solid content of the polymer solution was 15.0% by weight, and the pH and viscosity of the resultant dispersion was 9.3 and 18 cP, respectively. This dispersion was centrifuged to remove coarse particles, thereby obtaining Dispersion D-5 having an average particle diameter of 175 nm. This fine dispersion was diluted with water, diethylene glycol and ethylene glycol monobutyl ether (weight ratio=60:30:10) to obtain basic ink-jet Magenta Ink M-1 having a viscosity of 3.3 cP, a surface tension of 35 dyn/cm and a pH of 9.3. The final product had a solid content of about 7% by weight.

[Color Ink: Red Ink R-1]

A solution obtained by dissolving Copolymer P-6 (acid value: 290, weight average molecular weight: 5,000, glass transition temperature: 77° C.) composed of styrene, acrylic acid and ethyl acrylate in water using monoethanolamine was used to disperse an anthraquinone pigment Pigment Red 177 (Chromophthal Red A2B, product of Ciba-Geigy AG) therein. The dispersing procedure was the same as in Dispersion D-1. However, a weight ratio of the dispersant to the pigment was 1:5, the solid content of the polymer solution was 15.0% by weight, and the pH and viscosity of the resultant dispersion was 9.7 and 27 cP, respectively. This dispersion was centrifuged to remove coarse particles, thereby obtaining Dispersion D-6 having an average particle diameter of 135 nm. This fine dispersion was diluted with water, diethylene glycol and ethylene glycol monobutyl ether (weight ratio=60:30:10) to obtain basic ink-jet Red Ink R-1 having a viscosity of 3.5 cP, a surface tension of 37 dyn/cm and a pH of 9.6. The final product had a solid content of about 7.5% by weight.

[Color Ink: Cyan Ink C-1]

A solution obtained by dissolving Copolymer P-5 in water using ethanolamine was used to disperse Pigment Blue 15:6 (Fastgen Blue EP-7S, product of Dainippon Ink & Chemicals, Incorporated) therein. The dispersing procedure was the same as in Dispersion D-1. However, a weight ratio of the dispersant to the pigment was 1:4, the solid content of the polymer solution was 15.0% by weight, and the pH and viscosity of the resultant dispersion was 9.3 and 10 cP, respectively. This dispersion was centrifuged to remove coarse particles, thereby obtaining Dispersion D-7 having an average particle diameter of 120 nm. This fine dispersion was diluted with water, ethylene glycol and glycerol (weight ratio=70:15:15) to obtain basic ink-jet Cyan Ink C-1 having a viscosity of 2.7 cP, a surface tension of 45 dyn/cm and a pH of 9.2. The final product had a solid content of about 6% by weight.

[Color Ink: Green Ink G-1]

A solution obtained by dissolving Copolymer P-7 (acid value: 325, weight average molecular weight: 11,000, glass transition temperature: 84° C.) composed of styrene, methacrylic acid and butyl acrylate in water using potassium hydroxide was used to disperse Pigment Green 36 (Lyonol Green 6YK, product of Toyo Ink Mfg. Ca., Ltd.) therein. The dispersing procedure was the same as in Dispersion D-1. However, a weight ratio of the dispersant to the pigment was 1:4.5, the solid content of the polymer solution was 15.0% by weight, and the pH and viscosity of the resultant dispersion was 8.5 and 15 cP, respectively. This dispersion was centrifuged to remove coarse particles, thereby obtaining Dispersion D-8 having an average particle diameter of 125 nm. This fine dispersion was diluted with water, diethylene glycol and isopropyl alcohol (weight ratio=70:20:10) to obtain basic ink-jet Green Ink G-1 having a viscosity of 2.6 cP, a surface tension of 42.3 dyn/cm and a pH of 8.5. The final product had a solid content of about 6.0% by weight.

[Color Ink: Yellow Ink Y-1]

A solution obtained by dissolving Copolymer P-7 in water using diethanolamine was used to disperse Pigment Yellow 13 (Permanent Yellow GR, product of Hoechst AG) therein. The dispersing procedure was the same as in Dispersion D-1. However, a weight ratio of the dispersant to the pigment was 1:4, the solid content of the polymer solution was 15.0% by weight, and the pH and viscosity of the resultant dispersion was 8.8 and 18 cP, respectively. This dispersion was centrifuged to remove coarse particles, thereby obtaining Dispersion D-9 having an average particle diameter of 105 nm. This fine dispersion was diluted with water, glycerol and triethylene glycol monoethyl ether (weight ratio=60:30:10) to obtain basic ink-jet Yellow Ink Y-1 having a viscosity of 3.5 cP, a surface tension of 45 dyn/cm and a pH of 8.8. The final product had a solid content of about 6.5% by weight.

[Color Ink: Blue Ink BL-1]

A solution obtained by dissolving Copolymer P-8 (acid value: 360, weight average molecular weight: 4,500, glass transition temperature: 63° C.) composed of styrene and an isopropyl alcohol half ester of maleic anhydride in water using ethanolamine was used to disperse Pigment Violet 23 (Sumitone Fast Violet RW, product of Sumitomo Chemical Co., Ltd.) therein. The dispersing procedure was the same as in Dispersion D-1. However, a weight ratio of the dispersant to the pigment was 1:5, the solid content of the polymer solution was 15.0% by weight, and the pH and viscosity of the resultant dispersion was 9.5 and 15 cP, respectively. This dispersion was centrifuged to remove coarse particles, thereby obtaining Dispersion D-10 having an average particle diameter of 126 nm. This fine dispersion was diluted with water, diethylene glycol and diethylene glycol monoethyl ether (weight ratio=60:30:10) to obtain basic ink-jet Blue Ink BL-1 having a viscosity of 2.8 CP, a surface tension of 40 dyn/cm and a pH of 9.5. The final product had a solid content of about 7% by weight.

[Comparative Black Ink B-5]

Copolymer P-7 was used as a dispersant to prepare the following Carbon Black Dispersion D-11.

| | |
|---|---|
| Aqueous solution of Copolymer P-7 (solid content: 20% by weight) | 40 parts |
| Carbon black (MCF-88, product of Mitsubishi Chemical Industries Limited) | 24 parts |
| Diethylene glycol | 20 parts |
| Isopropyl alcohol | 10 parts |
| Water | 130 parts. |

The above formulation was subjected to a dispersion treatment in the same manner as in Black Ink B-1 to obtain a crude dispersion having a viscosity of 17 cP and a pH of 9.6. This dispersion was centrifuged to remove coarse particles, thereby obtaining Dispersion D-11 having an average particle diameter of 95 nm. This fine dispersion was diluted with water to obtain basic ink-jet Black Ink B-5 having a viscosity of 2.6 cP, a surface tension of 45 dyn/cm and a pH of 9.5. The final product had a solid content of about 7.5% by weight.

Examples 2 to 5 and Comparative Example

Printing Test:

An ink-jet printing apparatus, in which 4 bubble jet recording heads each having 256 nozzles in 400 dpi were aligned in a main scanning direction of the heads, was provided, and 4 inks of black, yellow, magenta and cyan colors, or black, red, blue and green colors were charged in their corresponding combinations shown in Table 1 into the respective recording heads through feeding tubes. This recording apparatus was used to conduct color ink-jet recording on Canon NP-Dry SK paper for electrophotography, Xerox 4024 paper and Prover bond paper. The recording was performed so as to form two patterns, i.e., Pattern A in which full solid prints of the individual inks adjoined to one another, and Pattern B in which black characters were arranged in color solid prints. The shot-in ink density of each ink in the full solid prints was 15 ml/m². The thus-obtained prints were evaluated as to bleeding in the following manner.

1. Evaluation of Print as to Bleeding:

Pattern A:

The degree of bleeding between the adjacent color patterns was observed to rank the inks in accordance with the following standard:

A: Boundaries were distinct, and no bleeding occurred

B: Bleeding occurred;

C: Bleeding or interdiffusion occurred to a considerable extent.

Incidentally, the rank A is a level practicable without problems.

Pattern B:

The quality of the black characters printed in the color solid prints was observed to rank the inks in accordance with the following standard:

AA: No bleeding occurred;

A: No bleeding occurred, but feathering occurred on the characters;

B: Bleeding occurred, and the contours of the characters were somewhat deformed;

C: Bleeding occurred to a considerable extent, and so the characters were illegible.

Incidentally, the ranks A and AA are levels practicable without problems.

The results of the evaluation as to the two items are shown in Table 2.

TABLE 2

Results of color printing test

|  | Resistance to bleeding between color solid prints | Resistance to bleeding between black characters and color solid prints |
|---|---|---|
| Ex. 2 | A | AA |
| Ex. 3 | A | AA |
| Ex. 4 | A | AA |
| Ex. 5 | A | AA |
| Comp. Ex. | A | C |

The inks shown in Table 3 were then evaluated in fixing ability and coloring ability in the following manner.

2. Evaluation of Inks in Fixing Ability:

Upon elapsed time of 10 seconds, 20 seconds and 30 seconds after conducting solid printing (overlap solid printing of 100% duty) on Xerox 4024 paper, the printed areas were rubbed with filter paper (No. 5C, trade name, product of Toyo Filter Paper K.K.) to evaluate the inks in fixing ability in accordance with the following standard:

AA: No rubbing off occurred in 10 seconds;

A: Rubbing off somewhat occurred in 10 seconds, but did not in 20 seconds;

B: Rubbing off somewhat occurred in 20 seconds, but did not in 30 seconds;

C: Rubbing off occurred in 30 seconds.

3. Evaluation of Inks in Coloring Ability:

The reflection densities of the 100% solid prints of the respective colors were measured by means of a Macbeth reflection densitometer RD-918 to use the resulting values as an index to the evaluation of the inks in coloring ability.

TABLE 3

Results of evaluation (paper used: Xerox 4024)

|  | Y-1 | M-1 | C-1 | R-1 | G-1 | BL-1 | B-1 | B-2 | B-3 | B-4 | B-5 |
|---|---|---|---|---|---|---|---|---|---|---|---|
| Fixing ability | A | A | A | A | A | A | B | B | B | B | C |
| Coloring ability (density) | 1.15 | 1.20 | 1.25 | 1.18 | 1.21 | 1.20 | 1.31 | 1.26 | 1.28 | 1.30 | 1.12 |

TABLE 1

Combinations of inks in color printing test

|  | Black ink | Yellow ink | Magenta ink | Cyan ink | Red ink | Blue ink | Green ink |
|---|---|---|---|---|---|---|---|
| Ex. 2 | B-1 | Y-1 | M-1 | C-1 |  |  |  |
| Ex. 3 | B-2 | Y-1 | M-1 | C-1 |  |  |  |
| Ex. 4 | B-3 |  |  |  | R-1 | BL-1 | G-1 |
| Ex. 5 | B-4 |  |  |  | R-1 | BL-1 | G-1 |
| Comp. Ex. | B-5 | Y-1 | M-1 | C-1 |  |  |  |

As apparent from the above-described examples, the ink sets and ink-jet recording method according to the present invention can provide recorded images good in printability on plain paper. On the other hand, the comparative example satisfied not all the bleeding, coloring ability and fixing ability.

According to the ink-jet recording method using the ink set of the present invention, as described above, prints free of occurrence of bleeding and feathering, excellent in fixing ability and good in coloring ability and fastness properties can be provided even when color recording is conducted on plain paper.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. An ink set for ink-jet recording, comprising a cationic black ink comprising carbon black and a water-soluble cationic polymer and an anionic color ink, wherein the carbon black has a pH value of from 7 to 10, has an average particle diameter of 80 to 200 nm, and is contained in the ink at an amount of 1 to 20% by weight, and wherein the water-soluble cationic polymer comprises at least a (meth)acrylic ester or (meth)acrylamide monomer having a tertiary amine salt or quaternary ammonium group.

2. The ink set according to claim 1, wherein a contact angle of the cationic black ink with plain paper is greater than 90°, and a contact angle of the anionic color ink with plain paper is not greater than 90°.

3. The ink set according to claim 1, wherein a penetration rate of the cationic black ink into a plain paper is lower than that of the anionic color ink.

4. The ink set according to claim 1, wherein at least one of the cationic black ink and the anionic color ink further comprises a water-soluble dye.

5. The ink set according to claim 1, wherein the ink set further comprises a plurality of anionic color inks as the anionic color ink, and the plurality of anionic color inks includes a yellow ink, a magenta ink and a cyan ink.

6. The ink set according to claim 1, wherein the ink set comprises a plurality of anionic color inks as the anionic color ink, and the plurality of anionic color inks includes a yellow ink, a magenta ink, a cyan ink, a red ink, a green ink and a blue ink.

7. The ink set according to claim 1, wherein the ink set comprises a plurality of anionic color inks as the anionic color ink, and the plurality of anionic color inks includes a red ink, a green ink and a blue ink.

8. The ink set according to claim 1, wherein a surface tension of the cationic black ink is higher than a surface tension of the anionic color ink so that a penetration rate of the cationic black ink into a plain paper is lower than a penetration rate of the anionic color ink.

9. The ink set according to claim 8, wherein the cationic black ink has a surface tension in a range of 40 to 65 dyne/cm, and the anionic color ink has a surface tension in a range of 25 to 40 dyne/cm.

10. The ink set according to claim 1, wherein the (meth) acrylic ester monomer having a tertiary amine salt or a quaternary amine salt and the (meth)acrylamide monomer having a tertiary amine salt or quaternary ammonium group include N, N-dimethylaminoethylmethacrylate, N, N-dimethylaminoethylacrylate, N, N-dimethylaminopropylmethacrylate, N, N-dimethylaminopropylacrylate, N, N-dimethylacrylamide, N, N-dimethylmethacrylamide, N, N-dimethylaminoethylacrylamide, N, N-dimethylaminoethylmethacrylamide, N, N-dimethylaminopropylacrylamide, and N, N-dimethylaminopropylmethacrylamide.

11. A cationic black ink for ink-jet recording comprising carbon black and a water-soluble cationic polymer, wherein the carbon black has a pH value of from 7 to 10, has an average particle diameter of 80 to 200 nm, and is contained in the ink at an amount of 1 to 20% by weight, and wherein the water-soluble cationic polymer comprises at least a (meth)acrylic ester or (meth)acrylamide monomer having a tertiary amine salt or quaternary ammonium group.

12. The cationic black ink according to claim 11, wherein the (meth)acrylic ester monomer having a tertiary amine salt or a quaternary amine salt and the (meth)acrylamide monomer having a tertiary amine salt or quaternary ammonium group include N, N-dimethylaminoethylmethacrylate, N, N-dimethylaminoethylacrylate, N, N-dimethylaminopropylmethacrylate, N, N-dimethylaminopropylacrylate, N, N-dimethylacrylamide, N, N-dimethylmethacrylamide, N, N-dimethylaminoethylacrylamide, N, N-dimethylaminoethylmethacrylamide, N, N-dimethylaminopropylacrylamide, and N, N-dimethylaminopropylmethacrylamide.

13. The cationic black ink according to claim 11, wherein the ink has a pH in a range of 3 to 7.

14. A cationic black ink for ink-jet recording comprising carbon black and a water-soluble cationic polymer, wherein the carbon black has a pH value of from neutral to alkaline, has an average particle diameter of from 80 to 200 nm, and is contained in the ink at an amount of 1 to 20% by weight, and wherein the water-soluble cationic polymer comprises at least a (meth)acrylic ester or (meth)acrylamide monomer having a tertiary amine salt or quaternary ammonium group.

15. An ink-jet recording process for recording an image, the image comprising a black image and a color image on a recording medium, comprising a step of ejecting a cationic black ink and an anionic color ink from respective ink-jet nozzles and attaching the respective inks on the recording medium, wherein the cationic black ink comprises carbon black having a pH value of from 7 to 10, having an average particle diameter of 80 to 200 nm, and that is contained in the ink at an amount of 1 to 20% by weight, and a water-soluble cationic polymer comprising at least a (meth) acrylic ester or (meth)acrylamide monomer having a tertiary amine salt or quaternary ammonium group.

16. The ink-jet recording process according to claim 15, wherein the anionic color ink contains a pigment corresponding to the color and an anionic polymeric dispersant.

17. The process according to claim 16, wherein the anionic polymeric dispersant has a hydrophilic group selected from the group consisting of a carboxylic group and a sulfonic group.

18. The process according to claim 15, wherein a contact angle of the cationic black ink with a plain paper is greater than 90°, and a contact angle of the anionic color ink with the plain paper is not greater than 90°.

19. The process according to claim 15, wherein a penetration rate of the cationic black ink into a plain paper is lower than a penetration rate of the anionic color ink.

20. The process according to claim 15, wherein at least one of the cationic black ink and the anionic color ink further comprises a water-soluble dye.

21. The process according to claim 15, wherein the anionic color ink is at least one of a yellow ink, a magenta ink and a cyan ink.

22. The process according to claim 15, wherein the anionic color ink is at least one of a yellow ink, a magenta ink, a cyan ink, a red ink, a green ink and a blue ink.

23. The process according to claim 15, wherein the anionic color ink is at least one of a red ink, a green ink and a blue ink.

24. The process according to claim 15, wherein a surface tension of the cationic black ink is higher than a surface tension of the anionic color ink so that a penetration rate of the cationic black ink into a plain paper is lower than a penetration rate of the anionic color ink.

25. The process according to claim 24, wherein the cationic black ink has a surface tension in a range of 40 to 65 dyne/cm, and the anionic color ink has a surface tension in a range of 25 to 40 dyne/cm.

26. The ink set according to claim 1, wherein the carbon black has a primary particle size of 15 to 40 nm.

27. The ink set according to claim 1, wherein the carbon black has a specific surface area of 50 to 300 $m^2/g$ in accordance with the BET method.

28. The ink set according to claim 1, wherein the carbon black has DBP oil absorption of 40 to 150 ml/100 g.

29. The ink set according to claim 1, wherein the anionic color ink contains a pigment corresponding to the color and an anionic polymeric dispersant.

30. The ink set according to claim 29, wherein the anionic-polymeric dispersant has a hydrophilic group selected from the group consisting of a carboxylic group and a sulfonic group.

* * * * *

UNITED STATES PATENT AND TRADEMARK OFFICE
CERTIFICATE OF CORRECTION

PATENT NO. : 6,399,674 B1
DATED : June 4, 2002
INVENTOR(S) : Akio Kashiwazaki et al.

It is certified that error appears in the above-identified patent and that said Letters Patent is hereby corrected as shown below:

Title page,
Item [56], References Cited, FOREIGN PATENT DOCUMENTS,
"JP   588316   3/1994" should be deleted.

Column 3,
Line 2, "the-present" should read -- the present --.
Line 9, "It is" should read -- it is --.
Line 39, "far" should read -- quite --.
Line 53, "C $_3$H$_6$N(CH$_3$)$_2$];" should read -- C$_3$H$_6$N(CH$_3$)$_2$]; --.

Column 4,
Line 47, "(all ," should read -- (all, --.

Column 6,
Line 32, "nm. The" should read -- nm, and the --.

Column 7,
Line 49, "having" should be deleted.
Line 50, "organicity" should be deleted.
Line 59, "-propylene" should read -- propylene --.

Column 8,
Line 57, "occur" should read -- occurs --.

Column 9,
Line 29, "however," should read -- however, the invention --.
Line 38, "not illustrated." should read -- (not illustrated). --.

Column 11,
Line 50, "diamter measurement-equipment:" should read -- diameter measurement equipment: --.

UNITED STATES PATENT AND TRADEMARK OFFICE
CERTIFICATE OF CORRECTION

PATENT NO. : 6,399,674 B1
DATED : June 4, 2002
INVENTOR(S) : Akio Kashiwazaki et al.

It is certified that error appears in the above-identified patent and that said Letters Patent is hereby corrected as shown below:

Column 13,
Line 51, "Ca., Ltd.)" should read -- Co., Ltd) --.

Column 20,
Line 5, "anionic-polymeric" should read -- anionic polymeric --.

Signed and Sealed this

Seventeenth Day of June, 2003

JAMES E. ROGAN
*Director of the United States Patent and Trademark Office*